G. L. STUART.
AUTOMOBILE SHOE OR CASING PATCH OR MENDER.
APPLICATION FILED DEC. 15, 1914.
1,174,909.
Patented Mar. 7, 1916.
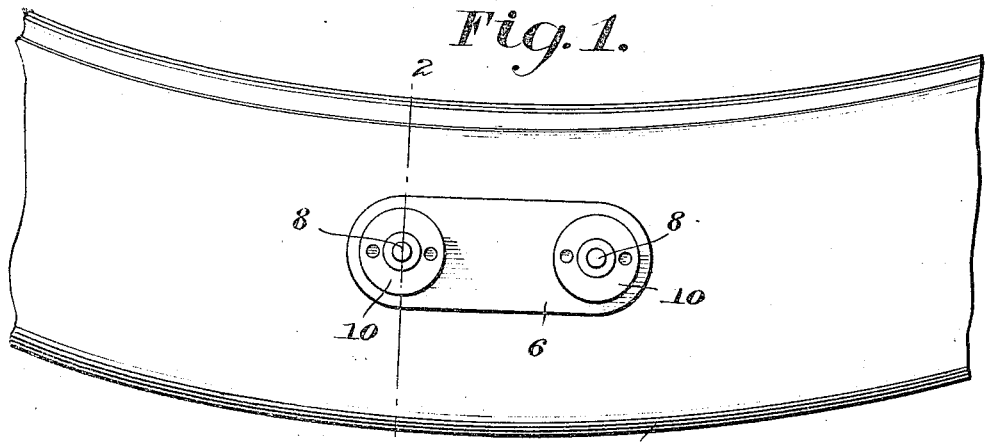
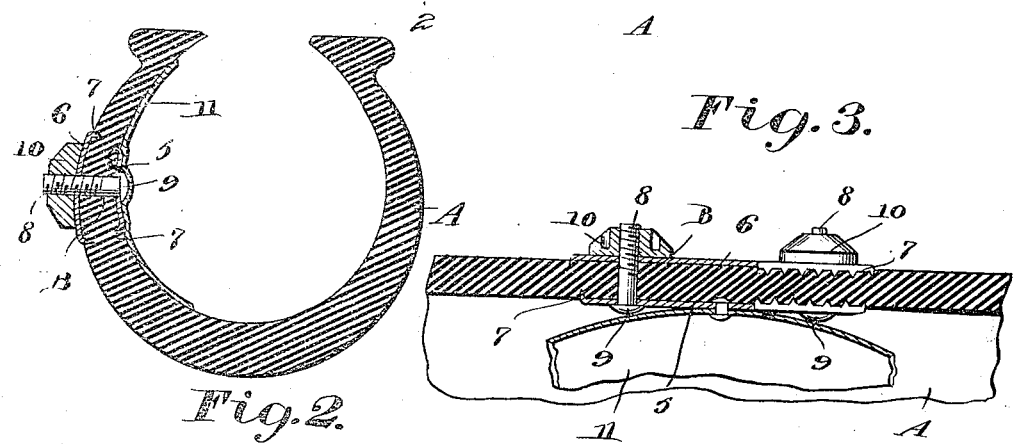
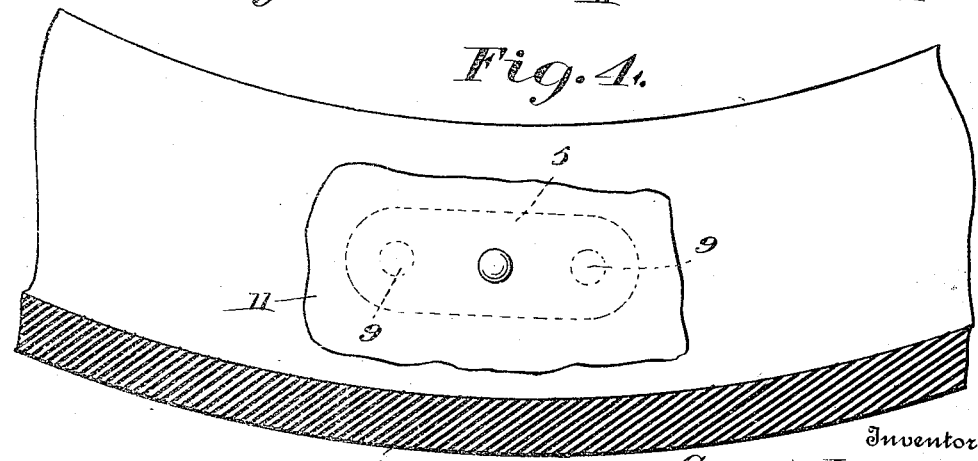
Inventor
George L. Stuart,
By Victor J. Evans
Attorney
Witnesses
Frederick W. Ely

UNITED STATES PATENT OFFICE.

GEORGE L. STUART, OF SAN DIEGO, CALIFORNIA.

AUTOMOBILE SHOE OR CASING PATCH OR MENDER.

1,174,909.  Specification of Letters Patent.  Patented Mar. 7, 1916.

Application filed December 15, 1914. Serial No. 877,380.

*To all whom it may concern:*

Be it known that I, GEORGE L. STUART, a citizen of the United States, residing at San Diego, in the county of San Diego and State of California, have invented new and useful Improvements in Automobile Shoe or Casing Patches or Menders, of which the following is a specification.

The invention relates to a tire patch or mender and more particularly to the class of devices for repairing blow-outs in automobile or other tires.

The primary object of the invention is the provision of a device of this character wherein on the breaking, cracking, or splitting of an outer casing of automobile or other like tires the same can be quickly and easily patched so that it may be further used, thereby increasing the life of such casing to render it useful until completely worn out.

Another object of the invention is the provision of a device of this character which is of novel form to assure easy application and its removal to and from the casing or shoe of an automobile or like tire, irrespective of the size thereof or the nature of the break or tear therein, thus rendering the casing or tube further serviceable.

A still further object of the invention is the provision of a device of this character which is simple in construction, reliable and efficient in its purpose, and inexpensive in manufacture.

With these and other objects in view, the invention consists in the features of construction, combination and arrangement of parts, as will be hereinafter more fully described, illustrated in the accompanying drawing, and pointed out in the claims hereunto appended.

In the drawings: Figure 1 is a fragmentary side elevation of a casing or shoe for use on an automobile or the like, showing the device constructed in accordance with the invention applied for the repair of a blow-out or tear in the casing or shoe. Fig. 2 is a sectional view of the line 2—2 of Fig. 1. Fig. 3 is a fragmentary longitudinal sectional view through the tire with the device applied and partly in section. Fig. 4 is a fragmentary plan view looking toward the inner face of the casing or shoe showing the device applied.

Similar reference characters indicate corresponding parts throughout the several views of the drawing.

Referring to the drawings in detail A designates a tire casing or shoe which is of the usual well-known construction and B designates for the sake of illustration a tear, break or split therein resulting from a blow-out of the inner tube adapted to be held within the casing or shoe and ordinarily used in a tire of an automobile or the like. This tear, break or split B in the casing or shoe A is adapted to be patched or mended by the use of the device hereinafter fully described.

The device comprises a pair of substantially elliptical shape, elongated, inner and outer plates 5 and 6 respectively, each being preferably made from spring steel, although the said plates may be made in any other desirable shape found expedient. Formed at the marginal edge of each plate are saw teeth which are bent at right angles thereto to form biting spurs 7 which are adapted to penetrate the casing or shoe A when both companion plates are placed on the inner and outer faces of the casing or shoe and are secured together in a manner presently described.

The plates 5 and 6 are adapted to be disposed on opposite faces of the casing or shoe A so as to cover a portion or all of the break, tear or split B therein and passing through these plates near the ends thereof and the casing or shoe A are bolts 8 the rounded heads 9 of which are disposed against the inner plates 5 while adjustably threaded on the outer ends of the said bolts are spanner receiving nuts 10 which work against the outer plate 6 and in this manner the plates are clamped together. It will be apparent that when the nuts 10 are tightened the plates 5 and 6 will be caused to approach each other at opposite faces of the casing or shoe A thus forcing the teeth or spurs 7 into the said casing or shoe so as to clamp the same for preventing the spreading or opening of the tear, break or split therein, thus rendering the said casing or shoe serviceable for further use.

Riveted or otherwise fixed centrally to the inner plate 5 is a section or piece 11 of flexible material, such as fabric to serve as a patch to protect the inner tube when placed within the casing or shoe, the said section or piece serving to add strength and also to make smooth surface for the said inner tube for preventing the cutting or damaging thereof when the device is applied to the casing or shoe for the repair or mending of the blow-out.

From the foregoing it is thought that the construction and operation of the invention will be clearly understood and therefore a more extended explanation has been omitted.

Having described the invention what is claimed is:—

1. A device of the class described comprising a pair of similarly shaped clamping plates having teeth at right angles thereto marginally of the same, bolt members passed through the plates at the opposite ends thereof for securing the same against the inner and outer faces of a casing or shoe of an automobile tire or the like, nuts threaded on the bolt members and working against the plate at the outer side of the casing or shoe and having indentations to accommodate a spanner wrench, and a flexible piece of material secured to the plate against the inner face of the casing or shoe at one point thereof only, whereby the flexible piece of material will overlie the said plate interiorly of the casing or shoe.

2. A device of the class described comprising a pair of complementary plates having spur edges, means for passing the plates on the inner and outer faces of a tire or shoe, and a patch connected to the plate disposed at the inner side of the tire or shoe.

3. A device of the class described comprising a pair of clamping members, fasteners for securing the members against the inner and outer faces of a casing or shoe of an automobile tire or the like, spurs on the marginal edges of the said members and adapted to bite into the body of the casing or shoe, and a flexible piece of material mounted on the member disposed at the inner sides of the casing or shoe.

In testimony whereof I affix my signature in presence of two witnesses.

GEORGE L. STUART.

Witnesses:
M. G. PURTLE,
ANNIE M. STUART.

Copies of this patent may be obtained for five cents each, by addressing the "Commissioner of Patents, Washington, D. C."